(12) United States Patent
Ganguly et al.

(10) Patent No.: US 11,586,652 B2
(45) Date of Patent: Feb. 21, 2023

(54) VARIABLE-LENGTH WORD EMBEDDING

(71) Applicant: International Business Machines Corporation, Armonk, NY (US)

(72) Inventors: Debasis Ganguly, Dublin (IE); Léa Deleris, Paris (FR)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/876,196

(22) Filed: May 18, 2020

(65) Prior Publication Data

US 2021/0357433 A1    Nov. 18, 2021

(51) Int. Cl.
*G06N 20/00* (2019.01)
*G06F 16/28* (2019.01)
*G06N 3/08* (2023.01)

(52) U.S. Cl.
CPC ............ *G06F 16/285* (2019.01); *G06N 3/08* (2013.01); *G06N 20/00* (2019.01)

(58) Field of Classification Search
CPC ......... G06F 40/30; G06F 16/285; G06N 3/08; G06N 20/00
See application file for complete search history.

(56) References Cited

U.S. PATENT DOCUMENTS

| | | |
|---|---|---|
| 5,890,110 A | 3/1999 | Gersho et al. |
| 9,037,464 B1 | 5/2015 | Mikolov et al. |
| 11,182,806 B1 * | 11/2021 | Arfa ................... G06Q 30/0201 |
| 2018/0150744 A1 * | 5/2018 | Orr ....................... G06N 3/0454 |
| 2018/0196873 A1 | 7/2018 | Yerebakan et al. |
| 2018/0232627 A1 | 8/2018 | Rozen et al. |
| 2020/0117710 A1 * | 4/2020 | Okura ................... G06F 40/274 |

OTHER PUBLICATIONS

Debasis Ganguly, Learning variable-length representation of words, Pattern Recognition 103 (2020) 107306, 2020 Elsevier Ltd, Available online Feb. 27, 2020; 35 USC 120(b)(1)(A) grace period disclosure.
Patrick Ng, dna2vec: Consistent vector representations of variable-length k-mers, ppn3Acs.cornell.edu.

* cited by examiner

*Primary Examiner* — Hau H Hoang
(74) *Attorney, Agent, or Firm* — Kurt Goudy; Nick Cadmus; Lou Percello, Attorney, PLLC

(57) ABSTRACT

A data structure is used to configure and transform a computer machine learning system. The data structure has one or more records where each record is a (vector) representation of a selected object in a corpus. One or more non-zero parameters in the records define the selected object and the number of the non-zero parameters define a word length of the record. One or more zero-value parameters are in one or more of the records. The word length of the object representation varies, e.g. can increase, as necessary to accurately represent the object within one or more contexts provided during training of a neural network used to create the database, e.g. as more and more contexts are introduced during the training. A minimum number of non-zero parameters are needed and zero-value parameters can be clustered together and compressed to save large amounts of system storage and shorten execution times.

20 Claims, 6 Drawing Sheets

Figure 2

| | Cat | P1 | P2 | P3 | 0 | 0 |
|---|---|---|---|---|---|---|

| | Sat | P1 | P2 | P3 | P4 | 0 | 0 |
|---|---|---|---|---|---|---|---|
| | Mat | P1 | P2 | 0 | 0 | 0 | 0 |
| | Hat | P1 | 0 | 0 | 0 | 0 | 0 |
| | Road | P1 | P2 | P3 | 0 | 0 | 0 |

VARIABLE-LENGTH WORD EMBEDDING

STATEMENT REGARDING PRIOR DISCLOSURES BY INVENTOR

The following disclosure is submitted under 35 U.S.C. 102(b)(1)(A): The publication entitled "Learning variable-length representation of words" was available online on 27 Feb. 2020, authored by the co-inventor Debasis Ganguly, in "Pattern Recognition" available at www.elsevier.com/locate/patcog.

BACKGROUND

The present invention relates to Machine Learning. More specifically, the invention relates to systems and methods for efficiently creating and using embedded databases of representations of objects with different contextual meanings in Machine Learning systems.

Many embodiments of Machine Learning (ML) systems are structured to have embedded databases that map objects to (numeric) representations so that the objects can be compared, selected, categorized, stored, indexed, organized, classified, etc. Here the term "object" has a general meaning and can refer to words in a document and/or corpus of documents, images and/or pixels in a corpus of images, geometries or patterns in a corpus of patterns, etc.

Some ML computer systems are initially trained with sets of training data. Often the training involves mapping objects in the training data with numeric representations, e.g. one or more (parameter) vectors, each with one or more numeric parameters mapped to a particular object. (The number of numeric parameters is sometimes defined as the length or dimensionality of the parameter vector.) The ML system may require multiple iterations through the training data before an accurate mapping between an object and its numeric representation is achieved and/or a database of representations can be created. Once trained, the ML system can use the database of numeric representations to identify and make inferences about unknown objects, i.e. target objects, that are also numerically represented.

For example, a ML system is trained on a corpus of words (objects). During the training, a vector representation with a word length of multiple numeric parameters (parameters) is mapped to the word "cat". When the training/mapping is complete the vector will have parameters with values that associate/map the vector with the word "cat". When an unknown target word has a numeric representation that matches the values of the parameters in the vector mapped to the word "cat", the system infers that the target word is "cat" and/or has the meaning of "cat". In ML systems, this process is repeated for an enormous number of objects.

To complicate the problem, the meaning of objects can vary greatly depending on the object context. For example, the word "cat" has very different meanings in each of the following phases: "the cat in the hat", "the cat sat", and "the cat dug a roadbed" (referring to a "caterpillar" earth moving machine). Enabling mapping to numeric representations that accurately represent objects for a wide number of contexts may require information within the representation (e.g. word length, or in other words, word vector dimensionality) to increase. For example, the number of variables or the "word length" of the vector mapped to the meaning of the word "cat" used in multiple contexts has to increase. Often the number of parameters needs to increase to very large word length to achieve an accurate mapping. However, this is not always the case.

Requiring embedded representations with large word lengths increases system storage requirements and processing time. This is particularly true if the storage systems must be designed to so every record has to accommodate the largest word lengths. This problem multiplies as ML systems need to train on larger and more complex corpuses of objects.

There is a need to reduce storage requirements and processing times of ML systems with embedded databases of numerical representations of objects while maintaining the accuracy of the object representation over multiple object contextual meanings.

SUMMARY

One non-limiting example embodiment of the invention is a data structure used to configure and transform a computer machine learning system. The data structure has one or more records where each record is a (vector) representation of a selected object in a corpus. An object identifier associates the record with the selected object. One or more non-zero parameters in the records define the selected object. The number of the non-zero parameters define a word length of the record. One or more zero-value parameters are in one or more of the records.

Another example embodiment of the present invention is a neural network (NN) or convolutional neural network (CNN) system that is trained/reconfigured using an object representation with minimum parameter word length as an initial NN system input to produce an NN system output that is an output representation of the object within one or more contexts. If the NN system fails to obtain an output that is an accurate representation of the object within one of the contexts meeting an error criteria, the parameter word length of the object representation/record increases and the process repeats until an output representing the object in the respective context within the error/tolerance is obtained. The process can be repeated for an object representation as input for one or more objects within each of one or more different contexts. Therefore, the word length of the object representation varies, e.g. can increase, as necessary to accurately represent the object within one or more contexts provided in the training, e.g. as more and more contexts are introduced during the training.

Other embodiments of the invention including the data structures and databases of data structures and their uses where the data structure has a parameter word length with one or more parameters of zero-value clustered together.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

FIG. 2 is a block diagram of a data structure of a plurality of vector representations, e.g. an embedded data structure, each vector representation being of a respective object, each with a variable parameter word length, and optionally one or more of the parameters with zero-value clustered together.

DETAILED DESCRIPTION

Figure 1:
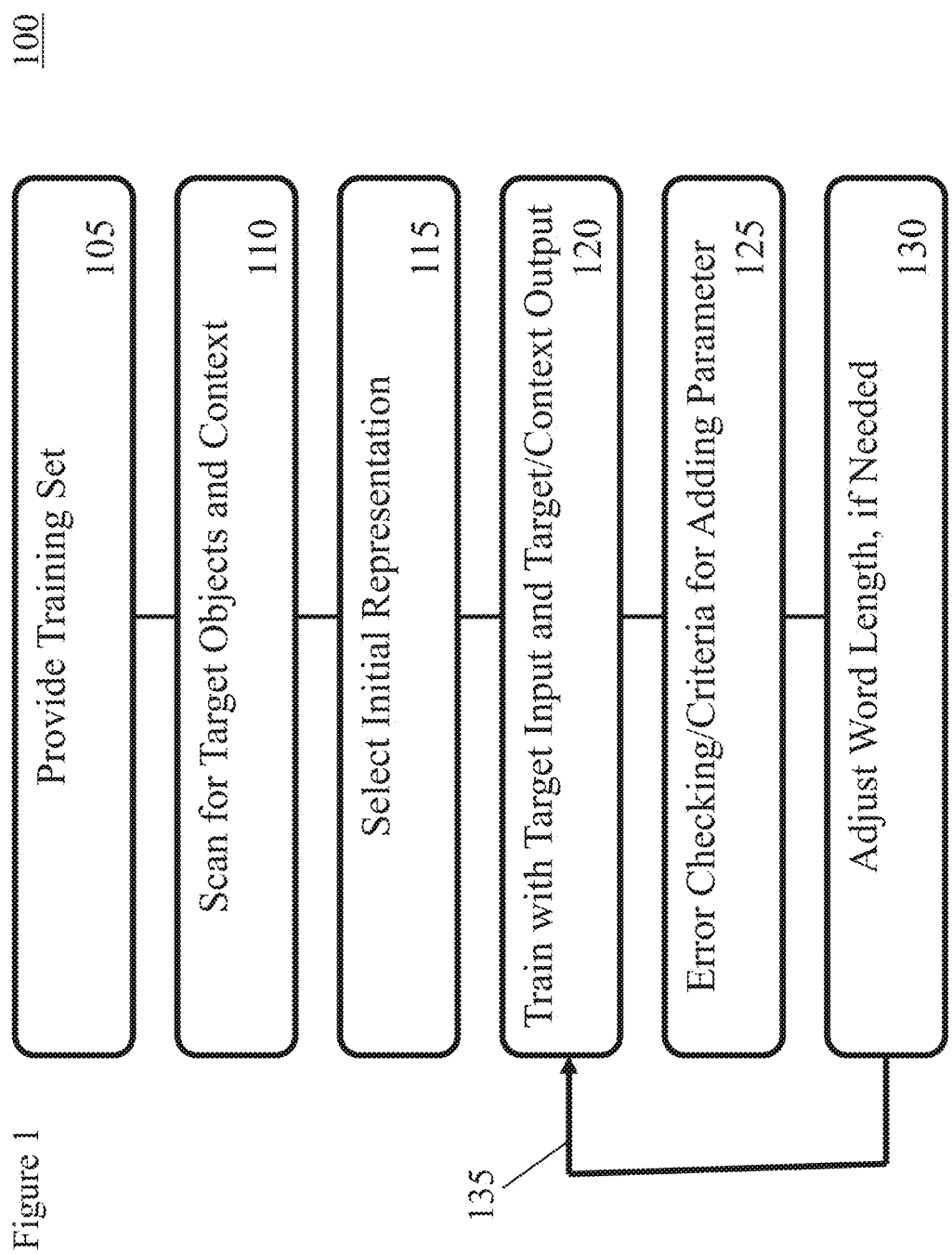
FIG. 1 is flow chart of a method for creating a variable-length word representation of an object.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, structures, and/or regions shown in the accompanying drawings are not drawn to scale, and that one or more layers, structures, and/or regions of a type commonly used may not be explicitly shown in a given drawing. This does not imply that the layers, structures, and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures may not be repeated for each of the drawings.

Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, functional circuitry, neural networks, etc. Systems and hardware incorporating the semiconductor devices and structures are contemplated embodiments of the invention.

As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin" or derivatives thereof may be used in place of "height" where indicated.

As used herein, "lateral," "lateral side," "side," and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element. As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that these terms might be affected by the orientation of the device described. For example, while the meaning of these descriptions might change if the device was rotated upside down, the descriptions remain valid because they describe relative relationships between features of the invention.

ML or deep learning systems/methods often use dense vector representations of objects, e.g. words and documents for Natural Language Processing (NLP), images (computer vision), user and product attributes (recommender systems), graphic nodes (social media analytics), etc. These vector representations are database structures that are embedded in the ML systems that change the configuration, operation, and/or performance of the ML systems. The ML systems and the system configuration, operation, and/or performance of the ML systems are transformed as the structure of these embedded database structures changes.

In the era of "big data", these vectors take up large storage spaces in both primary and secondary memory. Some of these vectors are sparsely populated, e.g. they have zero-values for parameters in random and/or disperse locations. However, because of this distribution of the zero-values, storage savings and process time reductions are limited, even though the database structure and the vector representations in these data structures are sparsely populated.

The present invention enables vector representations of objects where the number of parameters in the vector, e.g. the word length of the vector, can be reduced to a minimum while the vector maintains an accurate representation of and/or mapping to the word and/or concept, i.e. object. In some instances where vector representation has a fixed word length, the non-zero value parameters and the zero value parameters are each clustered together. Accordingly, the zero-value parameters can be stored by indicating the number of values that are zero-value without need for a memory location for each zero-value parameter.

Objects and concepts, including their meanings, change for objects within different contexts. Some objects can be accurately represented with a shorter word length vector (fewer parameters or fewer non-zero parameters) even for multiple contexts. However, some objects and concepts, especially those with meanings that change within different contexts, can require vector representations with longer word length for an accurate representation. To save system storage, it is desirable to have vectors in database with variable word lengths (or with variable numbers of non-zero value parameters) so the word length can vary to be only as long as needed to represent the respective object.

Both the variable word length vector data structure representations and the ability to cluster zero value parameters in the vector word enables ML systems to save storage space and make downstream tasks run faster.

While this disclosure has example embodiments that focus the NLP domain and words as objects, one skilled in the art, giving this disclosure, will understand that the invention and embodiments of the invention have applications in all areas of ML and the definitions of objects and the applications of the invention are not limited to the examples in this disclosure. Non-limiting examples of such other object instances include those of nodes in a graph, entities of a knowledge base etc.

Figure 2:
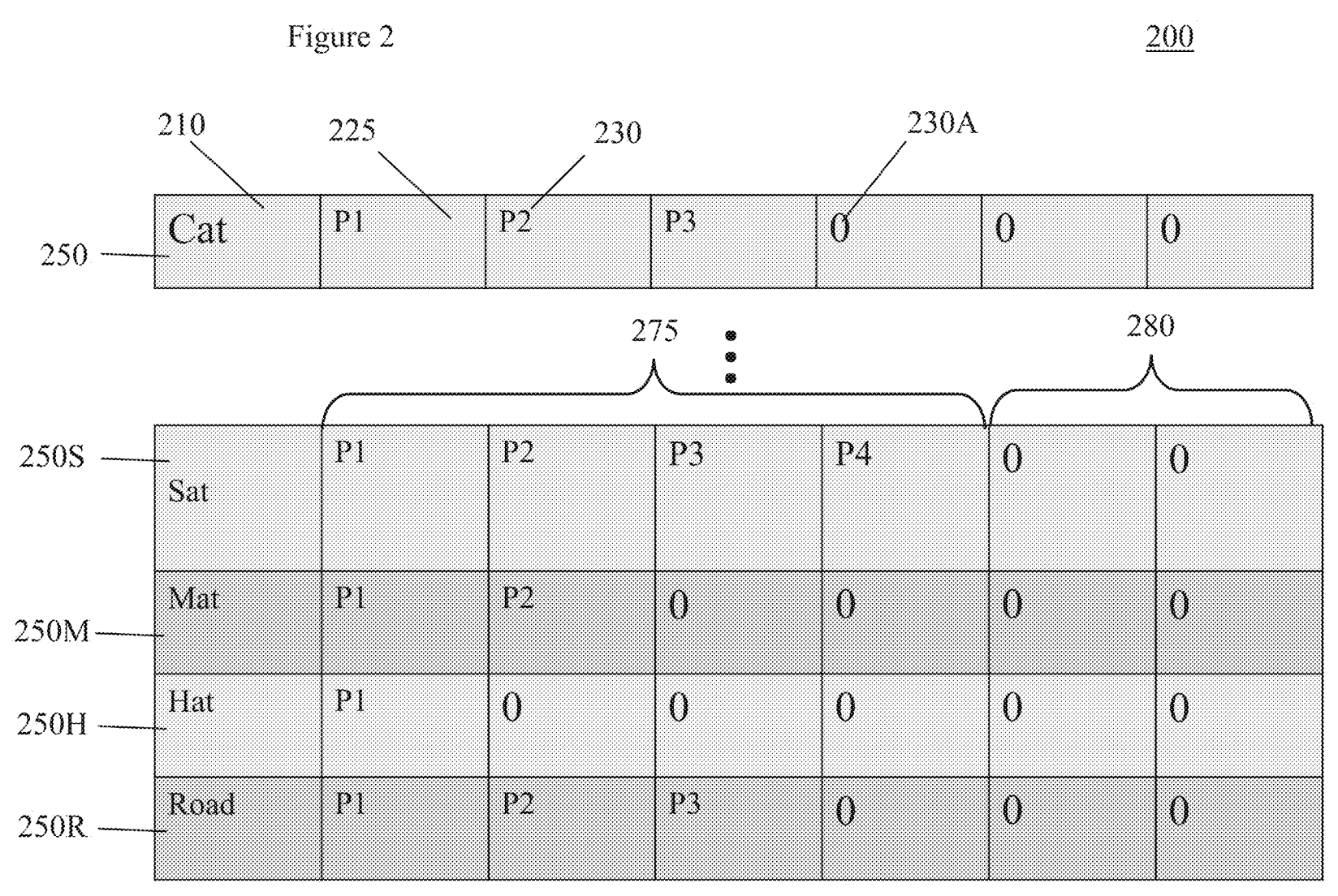
Figure 3:
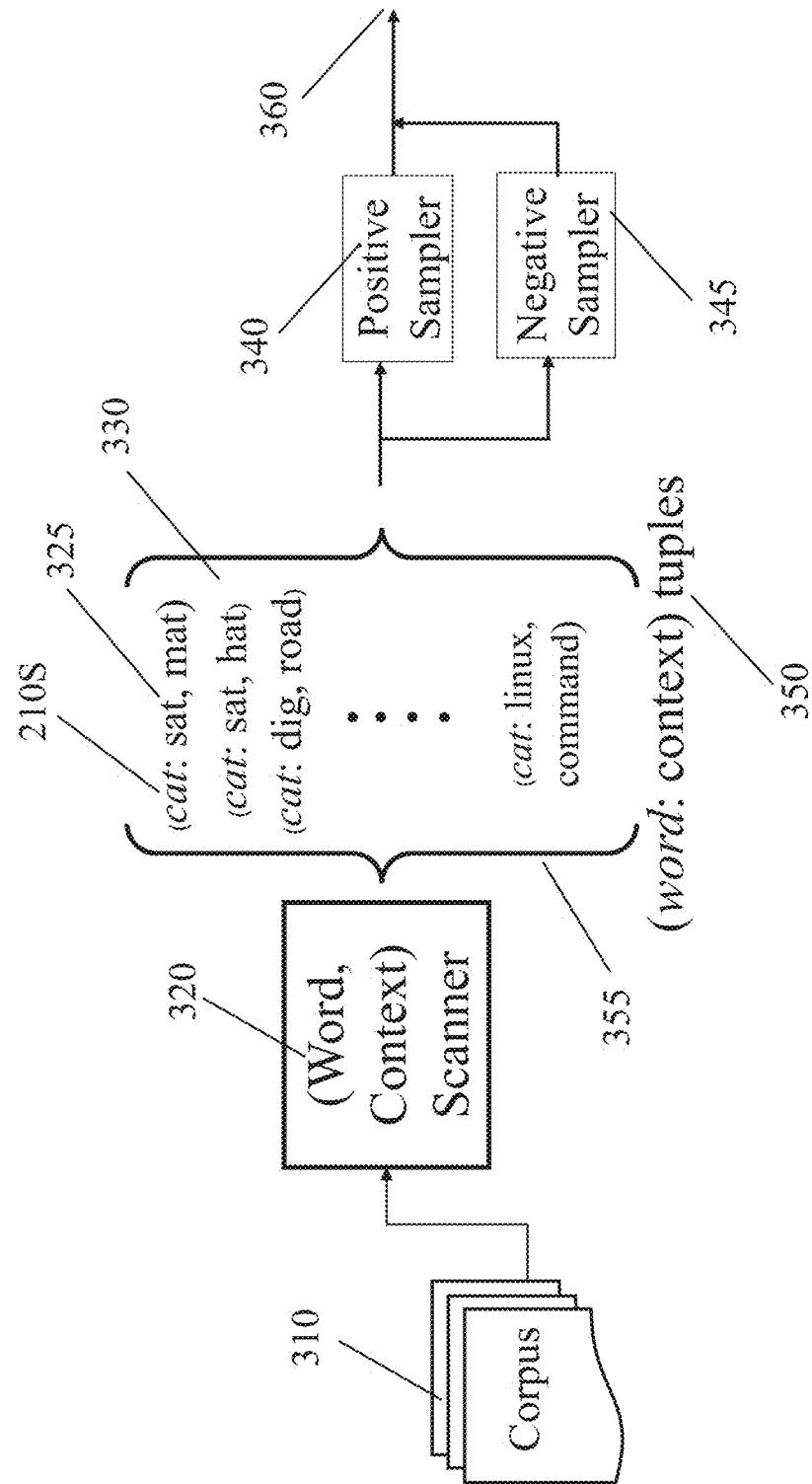
FIG. 3 is a block diagram of a scanning process/apparatus.

FIG. 1 is flow chart of a method 100 for creating a variable-length word representation of an object. Refer also to FIGS. 2 and 3 for the numeric references of invention features.

The process 100 begins with step 105 of providing a collection of documents, e.g. a training set or corpus 310, containing a large plurality of objects 210 to a neural network (NN).

In step 110 the documents 310 are scanned 110 by a scanner 320 to identify selected objects 210S and object context 325 associated with the respective selected object 210S.

In step 115, an initial representation or record 250 (shown in FIG. 2) of the selected object 210S is selected. The initial representation 250 has a minimum or initial word length 275. In some embodiments, the word length 275 is the number of parameters 225. In other embodiments, e.g. where the word length is fixed, the word length can be considered the number of non-zero parameters 230. In some of these embodiments, the zero value 230A parameters 225 are clustered together 280 in the representation 250, e.g. as zero-values clustered in parameter locations at the end 280 of the word in a vector representation 250. In any case, the initial representation has a minimum number of non-zero parameters 275. In some embodiments, the initial representation is a record 250 in a database 200, e.g. an embedded database, containing representations of a plurality objects 210 in the corpus 310 of the training set. (Refer to FIG. 3).

In step 120 the NN is trained with the selected object 210S representation 250 as input and a representation of the selected object combined with an associated context 325 selected by the scanner 320 as a desired output of the NN. The training process is described below.

In step 125, after training is complete, the final output of the NN is compared to the true/desired output to determine an output error. If the output error is within the threshold error criteria, no change is made to the initial representation 250 of the selected object 210S. For example, the initial representation of the selected object 210S remains unchanged in the database 200.

In step 130, if the output error fails the threshold error criteria, one or more non-zero parameters 230 is added to the word length 275 of the initial representation 250 of the selected object 210S. The process step 120 is run again 135. If the output error fails the threshold error criteria again, one or more non-zero parameters are added to update the initial representation 250 and steps 120 and 130 are repeated 135 until the output error falls within the threshold error criteria. At this point the resulting representation of the selected object 210S, meeting the threshold error criteria, with a lengthened and variable word length representation 250 has replace the corresponding first initial record 250 in the database 200.

If the output error never meets the threshold error criteria or the word length of the representation 250 of the selected object 210S becomes too large, a decision is made: 1. whether or not to include the selected word 210S with this particular context 325 in the database or 2. to update the database 200 with the most current representation 250.

Process 100 is repeated for one or more selected objects 210S and one or more contexts 325 for each of the selected objects 210S as defined by the user and/or by the corpus of the training set 310.

As demonstrated, the initial representation 250 of the selected object 210S starts with a minimal word length 275 of non-zero 230 parameters 225. If the initial representation 250 accurately represents the selected object 210S in all contexts 325 that are associated with the selected object 210S, no additions are made to the word length 275 of the initial representation 250 of the selected object 210S. However, if one or more contexts 325 of the selected object 210S is not accurately represented (within the criteria), non-zero value 230 parameters 225 are added to the word length 275 to update the initial representation 250 for each next iteration until there is an accurate representation 250. Therefore, the final version of the representation 250 of the object 210 in the database 200 has the minimum number of non-zero 230 parameters 225 in the word length 275 while still representing the respective object 210 and/or object 210 within all contexts 325 that were processed by the system. Due to the variable word length 275 and having only the minimum number of non-zero 225 parameters 225 necessary to represent the object 210 in all contexts 325 in the training set 310, there are fewer parameters 225 in one or more of the vector representations 250 in the database 200 and storage requirements and processing time of the system are reduced without losing accurate representation of the objects 210.

FIG. 2 is a block diagram of a data structure or database 200 of a plurality of vector representations or data structure records, typically 250. Each vector representation has a respective associated object 210 through an object identifier 210 and each vector representation 250 has a variable parameter word length 275 with optionally one or more parameters 225 of zero value 230A clustered together 280.

A typical vector representation (record) 250 has an associated object (identifier) 210. For example, vector representation 250 is associated with the object 210, "cat". Each of the vector representations 250 has one or more parameters, typically P 225. Each parameter 225 has a numeric value 230 associated with the object 210. Some parameters 225 are non-zero numeric values, e.g. P2 230. Other parameters 225 are zero-values 230A. Other vector representations 250 shown are vector representations 250S, 250M, 250H, and 250R for objects 210 "sat", "mat", "hat", and "road", respectively.

In some vector representations 250, for example vector representation 250S associated with "sat", the non-zero values (P1, P2, P3, and P4) are clustered 275 together. In some embodiments, there are only non-zero values 230 with no zero-values 230A. In these embodiments the word length 275 equals the number of non-zero parameters 275 plus the associated object 210 field.

In other embodiments, the zero-value parameters 230A are also clustered 280 together in a zero-value parameter cluster 280. In these embodiments, even though the non-zero parameters add to the actual length of the vector representation, the word length still equals the number of non-zero parameters 275 plus the associated object 210 field.

Since the zero-value 230A parameters 225 are clustered 280 together, there is no need to have a storage space for all of each of the zero-value 230A parameters 225. This information can be "compressed" by indicating only the number of zero-value 230A parameters 225 for a particular vector representation 250. Organizing and compressing the data like this saves a large amount of memory storage space, particularly for "big data" systems with complex and numerous vector representations 250.

FIG. 3 is a block diagram of a scanning process/apparatus 300 using a scanner 320.

A corpus 310 is inputted into the scanner 320. The corpus 310 can be a document or collection of documents with a plurality of words as objects 210. The objects 210 are often in a sequence. Other corpuses 310 can be an image or collection of images with the objects 210 being one or more pixels in the image, etc. Corpuses 310 are general and known in the art.

The scanner 320 scans the corpus 310, usually in a sequence, and identifies objects 210. For example, the scanner 320 will scan one or more documents 310 and select one or more words 210, e.g. like "cat". In addition, the scanner 320 selects context 325 for the selected object/word 210. In some embodiments, context 325 includes objects 210, e.g. other words on either side or on both sides of the selected object/word 210. For example, for the object sequence "the fat cat sat on the mat", the scanner 320 might select one object on either side of the selected object. In this example, the words "fat" and "sat" would be context 325 or context objects 325.

Context 325 can be selected in multiple ways. For example, context objects 325 can be selected as one object 210 on either side of the selected object 210S. In other embodiments, the context objects 325 are selected as the two objects on either side of the selected object 210S, or two objects preceding the selected object 210S and one object following the selected object 210S, etc. Various selection techniques for selecting context 325 are contemplated.

In some embodiments, the scanner 320 (scanning process 300) creates tuples 350 for the selected object 210S. For example, for each occurrence that the scanner 320 selects, a selected object 210S, e.g. the word "cat", the scanner 320 creates a tuple 350 that includes the selected object 210S and the context objects 325. Accordingly, as the scanner 320 traverses the corpus 310 a list 355 of tuples 350 (tuple list 355) is created for the selected object 201S, with each tuple 350 having a selected object 210S and a context 325 associated with the respective selected object 210S.

The tuple list 355 is input to a positive sampler 340 and negative sampler 345. The positive sampler collects instances, such as the ones shown in 325, i.e., tuples with positive association with the selected object 210S, identifying all such tuples (as shown in 350). The negative sampler 345 randomly samples instances of negative associations, i.e. tuples with negative association with the selected object 210S.

The output 360 of the scanner 300 is feed as input to the neural network (NN) 400.

Figure 4:
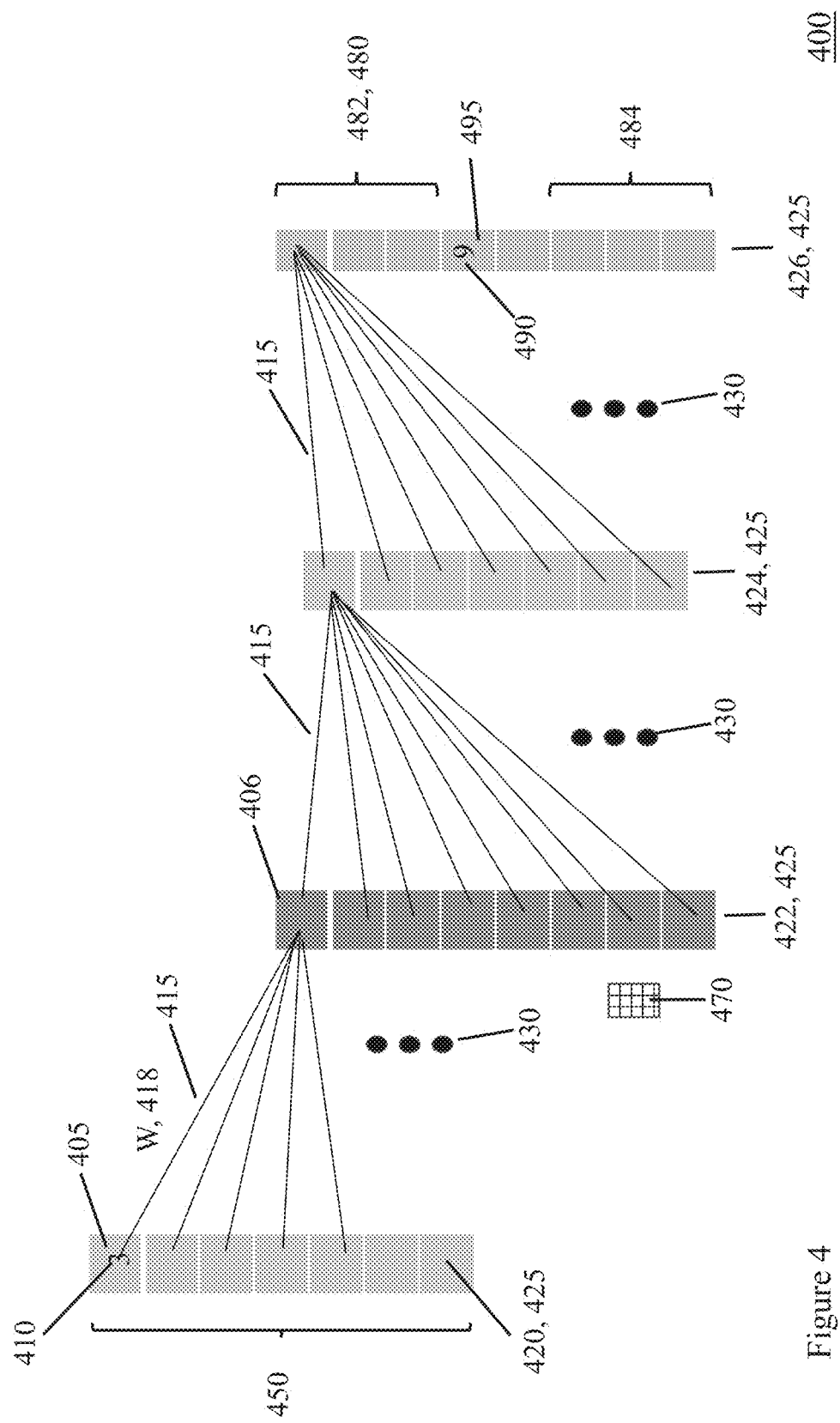
FIG. 4 is a diagram of a neural network during a training process that determines if an input object representation can represent the object in one or more contexts within a criterion.

FIG. 4 is a system architectural drawing of one embodiment of a neural network 400 during a training process that determines if an input object representation 450 can represent the object 210 in one or more contexts 325.

The neural network 400 comprises a plurality of neurons, typically 405. Each of the neurons 405 can store a value called an activation 410. For example, neuron 405 holds an activation 410 of value "3". Most of the neurons and activations have no reference number in FIG. 4 for clarity.

The neural network 400 comprises a plurality of layers, e.g. 420, 422, 424, 425, and 426, typically 425. There is a first layer or input layer 420 and a last layer or output layer 426. Between the input 420 and output 426 layer there are one or more hidden layers, e.g. 422, 424. Each of the layers 425 has a plurality of neurons 405. In some embodiments, the number of layers 425 and the number of neurons 405 in each of the layers 425 is determined empirically by experimentation.

In some embodiments, all the neurons 405 in a previous layer are each connected by an edge 415 to each one of the neurons 406 of a next layer. For example, a typical neuron 406 in a next (hidden) layer 422 is individually connected to each of the neurons 405 in the input layer 420 by an edge 415. In some embodiments, one or more of the edges 415 has an associated weight, W 418. In similar manner 430, each neuron 406 in a next layer, e.g. 424, is connected individually by an edge 415 to every neuron 405 in a previous layer, e.g. 422. The same type of connections 415 are made between each neuron in the second hidden layer 424 to each neuron of the first hidden layer 422 and likewise between each neuron 495 of the output layer 426 and all the neurons of the second hidden layer 424. These connections 430 are not shown in FIG. 4 for clarity.

In some embodiments, the activation 410 in each neuron 406 is determined by a weighted sum of the activations 410 of each connected neuron 405 in the previous layer. Each activation 410 is weighted by the weight (w, 418) of the edge 415 each connecting the neuron 406 to each of the respective neurons 405 in the previous layer, e.g. 420.

Accordingly, a pattern of activations 410 in a previous layer, e.g. 420, along with the weights (w, 418) on each edge 415, respectively, determine the pattern of activations 406 in the next layer, e.g. 422. In like manner, the weighted sum of set of activations 406 in the previous layer, e.g. 422, determine the activations of each neuron, typically 405, and therefore the activation pattern of neurons in the next layer, e.g. 424. This process continues until there is a pattern of activations represented by the activation, typically 490, in each of the neurons 495 in the output layer 426. Therefore, given a pattern of activations 405 at the input layer 420, the structure of the neural network 400, the weights (w, 418) and biases, b, (described below) determines an activation output pattern that is the activation of each of the neurons 495 in the output layer 426. If the set of activations in the input layer 420 change, the set of activations in the output layer 426 change as well. The changing sets of activations in the hidden layers (422, 424) are levels of abstraction that may or may not have a physical significance.

In some embodiments, the input layer 420 has the activation 410 in each of the neurons 405 that is set to the numeric values 230 of one of the respective parameters 225 of an initial vector representation 250 of a selected object word 210S in the data structure 200 for a given tuple 350 on the tuple list 355 created by the scanner 300.

In some embodiments, the output layer 426 is subdivided into two or more sublayers, e.g. 482 and 484, typically 480.

The sublayers of the output are the numeric values 230 of the respective parameters 225 of the vector representations 250 of the selected object word 210S concatenated with the respective parameters 225 of the vector representations 250 of the context objects/words 325.

For example, a first sublayer 482 of the output layer 426 would be the numeric values of the parameters 225 of the selected object word 210S, "cat", and the second sublayer 484 would contain the numeric values 230 of the parameters 225 of a first context object/word 325, "mat", and another sublayer 484 would contain the numeric values 230 of the parameters 225 of a second context object/word 325, "sat". The concatenation of the sublayers 482 can continue for as many vector representations 250 that map to context objects/words 325.

One mathematical representation of the transition from one layer to the next in the neural network 400 is as follows:

$$\begin{bmatrix} a_0^1 \\ a_1^1 \\ \vdots \\ a_n^1 \end{bmatrix} = \sigma \left( \begin{bmatrix} w_{0,0} & w_{0,1} & \cdots & w_{0,k} \\ w_{1,0} & w_{1,1} & \cdots & w_{1,k} \\ \vdots & \vdots & & \vdots \\ w_{n,0} & w_{n,1} & \cdots & w_{n,k} \end{bmatrix} \times \begin{bmatrix} a_0^0 \\ a_1^0 \\ \vdots \\ a_k^0 \end{bmatrix} + \begin{bmatrix} b_0 \\ b_1 \\ \vdots \\ b_n \end{bmatrix} \right)$$

or $$a^1 = \sigma(Wa^0 + b)$$

Where $a_n^1$ is the activation 410 of the nth neuron 406 in the next level, here level 1; $w_{n,k}$ is the weight (w, 418) of the edge 415 between the kth neuron 405 in the current level, here level 0, and the nth neuron 406 in the next level, here level 1; and $b_n$ is the bias value for the weighted sum of the nth neuron 406 of the next level. In some embodiments, the bias value can be thought of as a threshold value for turning on the neuron.

The term a is a scaling factor. For example, the scaling factor can be the sigmoid function or the rectified linear unit, e.g. ReLU (a)=max (0, a).

The neural network is trained by finding values for all the weights (w, 418) and biases, b. In some embodiments, known backward propagation methods are used to find the weight and bias values.

In some embodiments, to start the training, the weights and biases are set to either random values or some initial value set. The output, i.e. the activation pattern of the output layer 426 is compared to a desired result. In some embodiments, the desired result is the binary decision of whether a given word-context association pair (e.g. 210S with 325) is true/positive or not (corresponding to a negative sample) as initially set. Other desired results are envisioned.

During the NN training, a comparison of the actual output to the desired result, e.g. through a cost function (like the square root of the sum of the squares of the differences between the predicted value of a word-context association and its true binary value, i.e. a positive or negative) measures how close the output is to a desired output for a given input, e.g. an error. The cost function is minimized, e.g. by a gradient descent method, through an iterative process to determine how to change the weights and biases in magnitude and direction to approach the desired output. The weights and biases are changed, i.e. backward propagated, and another iteration is done. Multiple iterations are done until the output layer produces an activation pattern that is close to the desired result for a given activation pattern imposed on the input layer.

Once the actual output is close to the desired result, i.e. within a criteria or error criteria the iterations are stopped. Alternatively, if the desired result does not fall within the error criteria but the actual output fails to converge or converges at too slow a rate, the iterations also stop. See step 120 of method 100.

In alternative embodiments, the neural network is a convolutional neural network (CNN). In the CNN one or more of the hidden layers is a convolutional layer where a convolution is performed using one or more filters to detect, emphasize, or de-emphasize patterns in the layer. There are different filter types, e.g. to detect sub-shapes in images and/or sound sub-patterns. In preferred embodiments, the filter 470 is a matrix of values that convolves over the inputs to the layer to create a new pattern of inputs to the layer.

If the iterations stop because the actual output is close enough to the desired result, i.e. the error criteria are met, the initial value of the initial vector representation 250 of the selected object 210S is considered adequately mapped to the selected object (cat) 210S for the context 325 of the tuple 350 being analyzed. No change is made to the vector representation 250 of the selected object 210S at this point. See step 125 of method 100.

However, if the iterations stop because the actual output is not close enough to the desired result to meet the error criteria, the initial value of the initial vector representation 250 of the selected object 210S is considered not adequately mapped to the selected object ("cat") 210S for the context 325 of the tuple 350 being analyzed. In this case, one or more parameters 225 with a non-zero value 230 are added to the word length of the failed initial vector representation 250. The training cycle is performed again. This process repeats until the vector representation 250 of the selected object 210S meets the error criteria or some other termination point is reached. See steps 115, 120, 125, and 130 of method 100.

This is repeated for multiple tuples 350 of the selected object 210S over multiple contexts 325 as represented by tuples 350 in the tuple list 355 created by the scanner 300. The method is also repeated for multiple selected objects 210S selected by the scanner 300 and the associated contexts 325 represented in the created tuples 350.

After processing all the tuple lists 355 created by scanning 320 one or more corpuses 310, the data structure/database 200 is created with vector representations 250 with variable word lengths 200, as described above.

As noted, in some embodiments, when a parameter 225 with a non-zero value 230 needs to be added to the word length 275 of the vector representation 250, the addition is made so that the non-zero values 230 are grouped together 275 so that any zero-value 230A parameters 225 remained grouped together 280 as well.

The result is a data structure 200 of vector representations 250 with variable word lengths 275 for each selected object/word 210S selected from one or more corpuses 310 in tuples 350 by the scanner 300. The final vector representation 250 for each object 210 has enough non-zero value 230 parameters 225 to represents the object 210 within all contexts 325 selected in tuples 350 by the scanner 300 in tuple lists 355 from one or more of the corpuses.

By selecting initial vector representation 250 with a minimum number of parameters 225 and adding more new non-zero 230 parameters 225 only as required to make the actual output of the NN 400 meet the error criteria, the word length 275 of each of the vector representations 250 is minimized but remains accurately mapped to the object/word 210. This minimizes the dimensions required to accurately map the vector representation 250 to the object/word 210.

In addition, by maintaining many zero-value 230A parameters 225 in the initial vector representation 250 used as input representation 450 of the input layer 420, the calculation made to determine the activations 410 in each neuron 406 in each next layer, e.g. 422, 424, and 426 are made easier and faster.

The resulting database/data structure 200 can be embedded in a ML system as a mapping by which an unknown target object can be mapped to a known object 210 through the vector representations 250. If during operation the ML system fails because the data structure 200 does not recognize a context of the target object, the context can be learned by the ML system by running methods 100 and 500 again.

Figure 5:
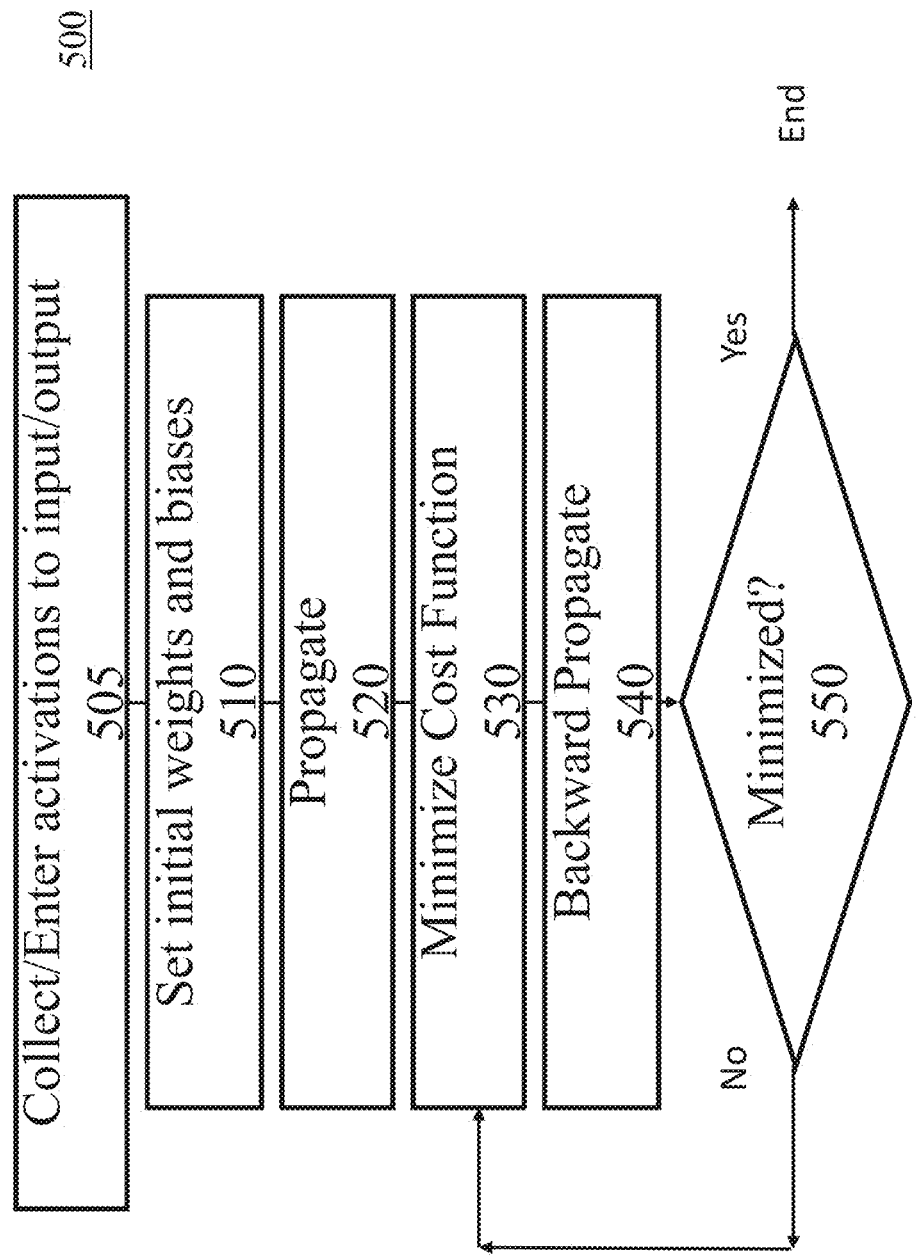
FIG. 5 is a flow chart of a training method.

FIG. 5 is a flow chart of a training method 500 used to train one embodiment 400 of the present invention.

In step 505 of the method 500 of the numeric values 230 of the vector representation 250 of the selected object 210S in the give tuple 350 is entered 505 to as an input representation 450 of the input layer 420 as the pattern of activations 410. The concatenation of the selected object 210S vector representation and the vector representations of the context objects 325 is entered as the output layers 480 (and/or sublayers 484) activations 490. These will also be the desired results for comparison during the error determination.

The weights 418 and bias, b, are initially set in step 510.

The activations 410 are propagated to the output layer 426 in step 520.

In step 530, the output 480 is compared to the desired results. A cost function is minimized to determine the magnitudes and direction of the changes needed for a set of new weights 418 and biases, b.

In step 540, the new weights 418 and biases, b, are backwardly propagated by known methods and a new set of outputs 480 is received.

A check is done in step 550 and non-zero value 230 parameters 225 are added to the initial vector representation (250, 450) as described above, if needed. If the output 480 meets the error criteria 550 (within a tolerance) the process 500 ends and the vector representation 250 is updated with the required non-zero value 230 parameters 225 in the database 220. If not, control returns to minimizing the cost function in step 530 and process iterates again until the error criteria 550 is met or the training is terminated for other reasons.

In some embodiments, the vector representations 250 are a fixed size, e.g. M, as defined by system architecture. Even in these ML systems, embedding the data structure 200 saves space because the system does not need to store the zero-value 230A parameter 225. The number of non-zero value 230 parameters 225 is kept to a minimum number, e.g. <min-size> dimension, since non-zero value 230 parameters 225 are only added to the word length 275 a necessary to accurately map to one or more contexts 325 in the one or more corpuses 310.

In some embodiments, the dimensions for the word length 275 only can grow depending on the norm of the error $\|w-c(w)\|$, i.e. higher this norm, the higher is the likelihood of increasing the number of dimensions by 1, where w denotes a parameterized linear encoding of a word (e.g. 210S) and c(w) represents the linear encoding of its context (e.g. a tuple from 330).

In embodiments where each vector representation 250 has a variable number of non-zero components 275 in the prefix of the vector representation 250 followed by number zero-value 230A parameters 225 grouped 280 together, the ML system does not need to store the zero-value 230A components/parameters 225. Each vector representation 250 just needs to store a list of $n_i$ number of non-zero 230 components/parameters 225. The compression achieved is:

Compression achieved=$1/M*\Sigma_i(M-n_i)$

Figure 6:
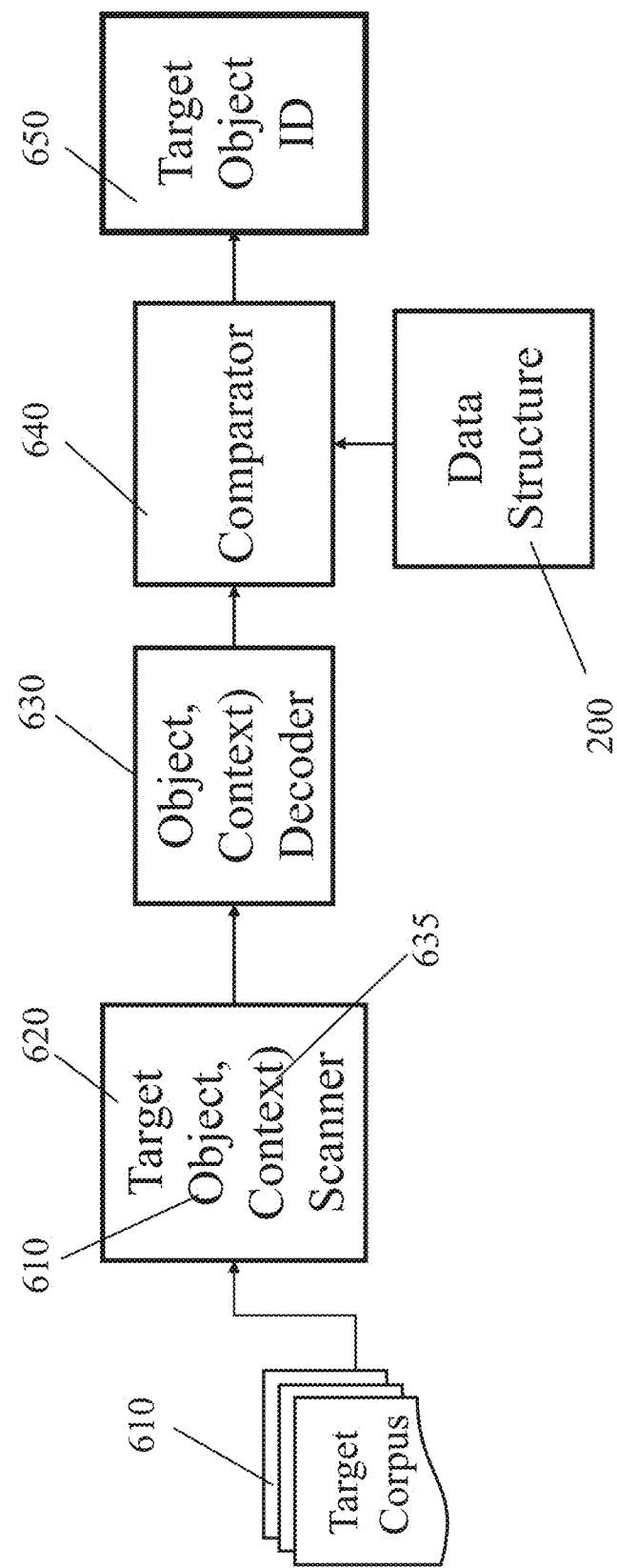
FIG. 6 is a block diagram of a system architecture of a Machine Learning system using variable-length word representations of objects.

FIG. 6 is a block diagram of a system architecture of a Machine Learning (ML) system 600 using variable-length word representations (200, 250) of objects 210.

The ML system 600 uses one or more computers with one or more central processing units, one or more user interfaces, one or more network interfaces, and one or more memories. General ML system architectures are well known.

The ML system has one or more scanners 620 that scans one or more documents 610 in a target corpus 610. The scanner 620 acquires one or more target objects 610 with one or more context objects 635 from the corpus 610. For example, the scanner 620 scans a document like a newspaper article 610 and acquires a target object/word 610, "cat" Context objects/words 635, e.g. the words 635 "sat" and "mat" are acquired and associated with the target word 610. Context words 635 may be identified because of their proximity to the target word 610.

A decoder 630 creates a target numeric representation for the target word 610. In an example realization, the decoding step involves a sigmoid layer of V dimensions, where V is the vocabulary. The indices corresponding to words present in the context of a word is set (assigned to the value of 1) the rest being 0, e.g. indices corresponding to words 'sat' and 'mat' would be set to 1 corresponding to the input word-context pair—<cat: (sat, mat)>. With this being the target vector of V dimensions, the network learns to predict this vector as accurately as possible. In some embodiments, the target numeric representation includes a representation for the target word 610 and the associated context 635.

A comparator 640 uses the target numerical representation to search a data structure, i.e. the data structure 200. The target object/word 610 is identified 650 if one or more records 250 in the data structure matches the target numeric representation.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A computer memory comprising:
   a plurality of memory locations;
   a data structure stored on one or more of the memory locations in the computer memory, the data structure further comprising:
   one or more records, each record being a vector representation of a selected object in a corpus;
   an object identifier in one or more of the records that associates the record with the selected object;
   one or more non-zero parameters in one or more of the records defining the selected object, a number of the non-zero parameters defining a word length of the record; and
   one or more zero-value parameters in one or more of the records,
   wherein the word length of one of the records is determined by the number of non-zero parameters needed to represent the selected object within one or more criterion.

2. The computer memory, as in claim 1, where the word length varies to make the vector representation meet the criteria.

3. The computer memory, as in claim 1, where the non-zero parameters in one or more records are grouped together.

4. The computer memory, as in claim 3, where the non-zero parameters are grouped together as a list.

5. The computer memory, as in claim 1, where the zero-value parameters in one or more records are grouped together.

6. The computer memory, as in claim 5, where the zero-value parameters in one or more records are identified in a single memory location by a number of the zero-value parameters.

7. The computer memory, as in claim 1, where the word length varies to represent the selected object within one or more contexts.

8. The computer memory, as in claim 7, where the contexts are defined by a vector representation of one or more context objects.

9. The computer memory, as in claim 8, where the context objects are within a proximity of the selected object in the corpus.

10. The computer memory, as in claim 7, where the criteria is whether an output of a neural network (NN) with the vector representation of the selected object as an NN input has an NN output that matches the vector representation of the selected object and one or more aggregated vector representation of one or more of the context objects, within an error tolerance.

11. A Machine Learning (ML) system comprising:
one or more central processing units (CPUs) and one or more memories;
one or more inputs for receiving a target corpus, the target corpus having a plurality of target objects;
a scanner that scans the corpus and obtains one or more target objects and one or more target context objects associated with the respective target object;
a decoder that creates a target representation of the target object;
a data structure further comprising:
one or more of the records, each record being a vector representation of a selected object in a corpus;
an object identifier that associates the record with the selected object;
one or more non-zero parameters defining the selected object, a number of the non-zero parameters defining a word length of the record; and
one or more zero-value parameters; and
a comparator that compares the target representation to one more records in a data structure to identify the target object, wherein the word length is determined by the number of non-zero parameters needed to represent the selected object within one or more criterion.

12. A ML system, as in claim 11, where the criteria is whether an output of a neural network (NN) with the vector representation of the selected object as an NN input has an NN output that matches a concatenation of the vector representation of the selected object with one or more of the context objects within an error tolerance.

13. A ML system, as in claim 11, where the zero-value parameters are identified in a single memory location by a number of the zero-value parameters.

14. A ML system, as in claim 11, where the word length varies to represent the selected object within one or more contexts.

15. A ML system, as in claim 11, where the non-zero parameters are grouped together as a list in a location in one or more of the memories.

16. A method of using a neural network (NN) to create a Machine Learning (ML) database, the method comprising the steps of:
scanning one or more documents in a training corpus to select one or more selected objects and one or more context objects from the training corpus, the context objects associated with and giving a context about the selected object;
using an initial representation of the selected object an NN input to the NN, the initial representation being a number of non-zero value parameters associated with the selected object, the number being a minimum number;
using the initial representation of the selected object concatenated with one or more representations of each of one or more of the context objects as a desired output of the NN; and
tuning the NN until the output of the NN is within an error tolerance of the desired output as a criteria,
wherein if the criteria is met, the initial representation of the selected object is not changed in a database.

17. A method, as in claim 16, where if the criteria is not met, a non-zero value parameter is added to the initial representation of the selected object and used as input to the NN and the tuning on the NN is repeated.

18. A method, as in claim 16, where each time the criteria is not met, another non-zero value parameter is added to the initial representation of the selected object and used as input to the NN and the tuning on the NN is repeated until the criteria is met and then the initial representation of the selected object is replaced with a new representation being the initial representation with the added non-zero value parameters.

19. A method, as in claim 18, where the non-zero value parameters in the initial representation and the added non-zero value parameter is added are clustered together in the new representation.

20. A method, as in claim 16, where one or more zero-value parameters in the new representation are clustered together.

* * * * *